UNITED STATES PATENT OFFICE 2,256,959

HYPOCHLORITE OF QUATERNARY AMMONIUM HYDROXIDE AND PRODUCTION THEREOF

Irving E. Muskat, Akron, Ohio, assignor to Pittsburgh Plate Glass Company, Allegheny County, Pa., a corporation of Pennsylvania No Drawing. Application November 7, 1940, Serial No. 364,698

15 Claims. (Cl. 260—290)

This invention relates to compounds containing active chlorine which may be prepared from organic ammonium hydroxides and is particularly directed to the compounds derived from quaternary ammonium hydroxides. In accordance with my invention, I have found that compositions of high active chlorine content may be prepared by interaction of organic ammonium hydroxides with a hypohalite, such as hypochlorous acid, hypobromous acid, hypoiodous acid, or with a halogen such as chlorine, bromine, iodine or other halogenating agent in an amount sufficient to neutralize a substantial quantity of the hydroxide. The product of the reaction is termed the corresponding hypohalite of the organic ammonium hydroxide.

Products of particular desirability have been prepared from quaternary ammonium hydroxides such as tetramethyl ammonium hydroxide, trimethyl phenyl ammonium hydroxide, trimethyl benzyl ammonium hydroxide, tetraethyl ammonium hydroxide, triphenyl methyl ammonium hydroxide, or other ammonium base in which the hydrogens in the ammonium radicle have been replaced by aliphatic, heterocyclic, araliphatic or aryl radicals such as the methyl, ethyl, propyl, vinyl, allyl, propargyl, methallyl, crotyl, cinnamyl, oleyl, ricinoleyl, cyclohexyl, lauryl, decyl, cetyl, linoleyl, furfuryl, hydroxy ethyl, hydroxy allyl, cresyl, phenyl, benzyl, naphthyl or similar radicle. Thus, various ammonium bases such as trimethyl allyl ammonium hydroxide, dimethyl phenyl allyl ammonium hydroxide, dimethyl phenyl methallyl ammonium hydroxide, diethyl phenyl allyl ammonium hydroxide, dodecyl, dimethyl methallyl ammonium hydroxide, N-dodecyl phenyl dimethyl ammonium hydroxide, N-octadecyl benzyl dimethyl ammonium hydroxide, N-octadecyl trimethyl ammonium hydroxide, dimethyl dodecyl hydroxy ethyl ammonium hydroxide, N-methyl-(2-ethoxy propenyl) piperidinium hydroxide, N-ethyl-N(carbethoxy methyl) piperidinium hydroxide N-cyanmethyl N-phenyl piperidinium hydroxide, trimethyl-2-oxy phenyl ammonium hydroxide, trialkyl (gamma dodecyloxy β-hydroxy propyl) ammonium hydroxide, dimethyl piperidinium hydroxide, diethyl piperidinium hydroxide, dipropyl, di octyl, dioleyl, diphenyl, or other di alkyl, di aryl or di aralkyl piperidinium hydroxide, N-methyl pyridinium hydroxide, N-ethyl pyridinium hydroxide, N-vinyl pyridinium hydroxide, ethoxy methyl diethyl ammonium hydroxide, cyclopropyl trimethyl ammonium hydroxide, hydroxides of the type

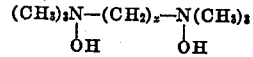

where $x$ is a small whole number (3, 5, 7, etc.) choline, phenyl alanine choline, tetrahydroquinoline and tetrahydroisoquinoline, bases, quaternary bases secured by hydrolysis of the products produced by reaction of quinoline with alkyl halides such as ethyl or methyl halide or quaternary ammonium hydroxide derived from pyridine may be utilized in accordance with the present invention. Preferably, it is desirable to treat the more stable bases such as tetramethyl or trimethyl phenyl ammonium hydroxide and other similar aliphatic or araliphatic ammonium bases which do not readily decompose into the corresponding amine and water. Due to the fact that the quaternary ammonium hydroxides are strong bases, the preparation of the corresponding hypochlorites or active chlorine derivatives in stable form may be effected without difficulty by interaction with a hypohalogenous acid such as hypochlorous or hypobromous acid. The products so produced are found to be very stable, particularly in aqueous solutions, over a period of many months.

Other hypochlorites, or hypobromites, may be prepared by treatment of mono- di- or tri-substituted ammonium hydroxide such as triphenyl ammonium hydroxide, trimethyl ammonium hydroxide, mono methyl, mono ethyl, or mono propyl ammonium hydroxide, trioleyl, tristearyl, dicresyl, diphenyl, dibenzyl or dinaphthyl ammonium hydroxide or similar organic ammonium hydroxide with a hypohalogen.

The products prepared in accordance with the present invention are usually soluble in water and are stable in aqueous solutions over periods of many months. They are capable of wide use as antiseptic, sterilizing or germicidal agents. In general, it is found desirable to prepare the products by neutralization with an aqueous solution of hypochlorous acid or other hypohalogenous acid. However, the materials may be prepared by treating an aqueous solution of the hydroxide with a halogen such as chlorine, bromine, or iodine by treating with salts of hypochlorites such as calcium or sodium hypochlorite or with other chlorinating or halogenating agent.

The products are generally prepared in an aqueous medium and, in general, the resulting solutions are used as such without recovery of the pure hypochlorite. Upon evaporation of the solution some of these compounds may decompose. Since many of the hypochlorites prepared in accordance with this invention are very soluble in water, solutions having an active chlorine content as high as 200–500 grams per liter may be prepared without difficulty. In general, it is found, however, that the more dilute solutions containing 25–50 grams per liter of active chlorine thereof, are somewhat more stable.

The following examples are illustrative:

*Example I*

30 liters of a cold solution containing 43.8 grams per liter of HOCl was slowly added to 25 liters of an aqueous solution of cold tetramethyl ammonium hydroxide which contained 99.8 grams of the hydroxide per liter. The mixture was agitated during the addition. The resulting solution contained 31.6 grams of active chlorine per liter and 2.7 grams per liter of excess tetramethyl ammonium hydroxide. The solution lost no substantial amount of active chlorine over a period of several months.

*Example II*

75 liters of a cold solution containing 43.8 grams per liter of HOCl was slowly added with stirring to 25 liters of a cold solution of trimethyl benzyl ammonium hydroxide containing 381 grams per liter of the hydroxide. The resulting solution contained 42.0 grams per liter of active chlorine and 7.5 grams of excess hydroxide. It was stable and lost no substantial amount of active chlorine over a period of several months.

*Example III*

An aqueous hypochlorous acid solution containing 100 grams per liter of HOCl was slowly mixed with a 5 percent aqueous solution of N-methyl pyridinium hydroxide in the proportion of one mole of HOCl per mole of hydroxide while maintaining the temperature of the solution below about 30° C. The resulting aqueous solution contained approximately 15 grams per liter of active chlorine and was stable over a period of many months.

If desired, the hypochlorites may be prepared by treatment with chlorine and in such a case, some of the hydroxide may be converted into the corresponding chloride. In order to prevent this, the chlorination may be conducted in the presence of an alkali metal or alkaline earth metal hydroxide, whereby the organic ammonium hypochlorite is almost entirely converted into a hypochlorite, the alkali metal or alkaline earth metal chloride forming in preference to the substituted ammonium chloride. Sodium, calcium, or lithium hydroxide may be used for this purpose.

The expression "active chlorine" or "active halogen" as used in the specification and claims means chlorine or halogen, as the case may be, available for effecting an oxidation or bleaching reaction.

Although the present invention has been described with reference to the specific details of certain embodiments thereof, it is not intended that such details shall be regarded as limitations upon the scope of the invention except insofar as included in the accompanying claims. This application is a continuation-in-part of my co-pending application Serial No. 273,551, filed May 13, 1939.

I claim:

1. A hypohalite of a quaternary ammonium hydroxide characterized by the fact that a substantial portion of the halogen in said hypohalite is present as active halogen.

2. A hypochlorite of an aliphatic quaternary ammonium hydroxide characterized by the fact that a substantial portion of the chlorine in said hypochlorite is present as active chlorine.

3. A hypochlorite of a heterocyclic quaternary ammonium hydroxide characterized by the fact that a substantial portion of the chlorine in said hypochlorite is present as active chlorine.

4. N-alkyl pyridinium hypochlorite.

5. N-alkyl pyridinium hypohalite.

6. A method of preparing a halogen derivative of a quaternary ammonium hydroxide containing a substantial quantity of active halogen which comprises halogenating an aqueous solution thereof until a substantial portion of the hydroxide group is neutralized.

7. A method of preparing a halogen derivative of a quaternary ammonium hydroxide containing a substantial quantity of active halogen which comprises reacting a hypohalogenous acid with said hydroxide until a substantial portion of the hydroxide is neutralized.

8. A method of preparing a chlorine derivative of a quaternary ammonium hydroxide containing a substantial quantity of active chlorine which comprises reacting said hydroxide with sufficient hypochlorous acid to neutralize a substantial portion of the hydroxide.

9. A method of preparing a halogen derivative of an N-alkyl pyridinium hydroxide containing a substantial quantity of active chlorine which comprises halogenating an aqueous solution thereof until a substantial portion of the hydroxide is neutralized.

10. A method of preparing a chlorine derivative of an aliphatic quaternary ammonium hydroxide containing a substantial quantity of active chlorine which comprises reacting said hydroxide with sufficient hypochlorous acid to neutralize a substantial portion of the hydroxide.

11. A method of preparing a halogen derivative of an organic ammonium hydroxide containing a substantial quantity of active chlorine which comprises reacting a hypohalogenous acid with said hydroxide characterized by the fact that a substantial portion of the halogen in said halogenated compound is present as active chlorine.

12. A hypohalite of an organic ammonium hydroxide which has the structure

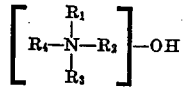

in which $R_1$ is an organic radical, $R_2$, $R_3$, and $R_4$ are radicals of a group consisting of hydrogen and organic radicals which are linked to the nitrogen atom by a carbon atom of each of $R_1$, $R_2$, $R_3$, and $R_4$, characterized by the fact that said hypohalite contains a substantial quantity of active halogen.

13. A hypochlorite of an organic ammonium hydroxide which has the structure

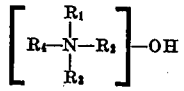

in which $R_1$ is an organic radical, $R_2$, $R_3$, and $R_4$ are radicals of a group consisting of hydrogen and organic radicals which are linked to the nitrogen atom by a carbon atom of each of $R_1$, $R_2$, $R_3$ and $R_4$, characterized by the fact that said hypochlorite contains a substantial quantity of active halogen.

14. A method of preparing an organic ammonium hypochlorite containing a substantial quantity of active chlorine which comprises chlorinating an aqueous solution of an organic ammonium hydroxide in the presence of an hydroxide of a metal of the group consisting of alkali and alkaline earth metal metals.

15. A method of preparing a quaternary ammonium hypochlorite containing a substantial quantity of active chlorine which comprises chlorinating an aqueous solution of a quaternary ammonium hydroxide in the presence of an hydroxide of a metal of the group consisting of alkali and alkaline earth metals.

IRVING E. MUSKAT.